(12) United States Patent
Segeral

(10) Patent No.: US 6,993,979 B2
(45) Date of Patent: Feb. 7, 2006

(54) MULTIPHASE MASS FLOW METER WITH VARIABLE VENTURI NOZZLE

(75) Inventor: Gerard Segeral, Gif sur Yvette (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 63 days.

(21) Appl. No.: 10/486,018

(22) PCT Filed: Jul. 15, 2002

(86) PCT No.: PCT/EP02/07900

§ 371 (c)(1),
(2), (4) Date: Feb. 5, 2004

(87) PCT Pub. No.: WO03/019118

PCT Pub. Date: Mar. 6, 2003

(65) Prior Publication Data

US 2004/0237664 A1 Dec. 2, 2004

(30) Foreign Application Priority Data

Aug. 20, 2001 (EP) .......................... 01402194

(51) Int. Cl.
*G01F 1/44* (2006.01)

(52) U.S. Cl. ................................. 73/861.64
(58) Field of Classification Search ............... 73/861, 73/861.02, 861.04, 861.64; 138/44; 378/140
See application file for complete search history.

(56) References Cited

U.S. PATENT DOCUMENTS

| 4,023,942 | A | * | 5/1977 | Brady et al. ................. 96/323 |
| 4,829,831 | A | * | 5/1989 | Kefer et al. ............. 73/861.02 |
| 5,261,415 | A | * | 11/1993 | Dussault ..................... 600/532 |
| 6,024,129 | A | * | 2/2000 | Schima ........................ 138/44 |
| 6,594,341 | B1 | * | 7/2003 | Lu et al. ..................... 378/140 |

FOREIGN PATENT DOCUMENTS

| EP | 0596201 A | 5/1994 |
| EP | 0596201 A | 5/1994 |
| EP | 0679873 A | 11/1995 |
| EP | 0679873 A | 11/1995 |
| WO | WO 9910712 A | 3/1999 |
| WO | WO 9910712 A | 3/1999 |

* cited by examiner

*Primary Examiner*—Max Noori
*Assistant Examiner*—Jewel V. Thompson
(74) *Attorney, Agent, or Firm*—Victor H. Segura; Brigitte L. Echols

(57) ABSTRACT

An insert device for narrowing a throat of a Venturi based multiphase flow meter is shaped to be inserted in the throat. The insert comprises an entrance window and an exit window for a radiation beam generated at a periphery of the throat. The insert allows pressure takeoff to be made in a conventional way. Several examples of insert device are described including a rod, a tubular and a tuning fork insert.

24 Claims, 5 Drawing Sheets

MULTIPHASE MASS FLOW METER WITH VARIABLE VENTURI NOZZLE

BACKGROUND OF THE INVENTION

The invention relates in general to measurements intended to determine at least one characteristic of oil well effluents made up of multiphase fluids, typically comprising three phases: two liquid phases—crude oil and water—and one gas phase. In particular the invention relates to such measurements performed using a composition meter associated or not with a Venturi based flow meter.

The ability of the oil industry to optimise production of a reservoir relies on the possibility of evaluating the well effluent at regular intervals, in terms of quantity (flow rate) and of composition (the proportions of the various phases). This makes it possible to determine what corrective action may need to be taken. However, measuring the flow rate of oil well effluent is a problem that is complex because of the way effluents are usually made up of three phases, and because of the changes in flow conditions to which they are subject (flow rates, fluid fractions, pressure, upstream pipe geometry). These factors give rise to a wide variety of flow regimes being observed, including some regimes of highly non-uniform and unstable character, with the proportions of the phases in the fluid mixture being capable of varying very considerably both in the flow direction (i.e. over time) and across the flow direction, in the form of phase stratification across the flow section.

Numerous proposals based on a Venturi type flow meter have been made to evaluate the well effluent. Amongst those proposals, the international patent application WO99/10712 provides for a Venturi and a gamma ray density meter placed at the throat of the Venturi. The effluent is passed through the Venturi in which it is subjected to a pressure drop. A mean value of the pressure drop is determined over a period of time using pressure sensors and a mean value is determined for the density of the fluid mixture at the throat of the Venturi using the gamma ray density meter. The mean values are used to deduce a total mass flow rate value. Finally further measurements and calculations allow to obtain oil, water and gas flow rates.

While the proposed Venturi flow meter offers a reliable performance in most encountered environments, it becomes difficult to obtain good results at relatively low flow rates. Indeed at low flow rates, the pressure drop measured between the inlet and the throat of the Venturi is becoming too small to provide the flow rate expected accuracy.

Low flow rates may occur when a well produces fewer amounts than expected. This may occur right at the start of measurements or in the course of life of the well.

One solution to the problem of a decreasing pressure drop would be to replace the Venturi flow meter with another Venturi flow meter having a smaller throat diameter. Hence the pressure drop would increase and measurements become more accurate. However the replacement of the Venturi requires to disassemble parts of the Venturi including the gamma ray source, the photomultiplier used to measure the gamma rays and the pressure lines at the inlet and outlet of the Venturi. This makes the replacement a hazardous, expensive and time consuming operation.

SUMMARY OF THE INVENTION

In a first aspect the invention provides an insert device for narrowing a throat of a Venturi based multiphase flow meter. The insert device is shaped to be inserted in the throat. The insert comprises an entrance window and an exit window means for a radiation beam generated at a periphery of the throat.

Appropriately the insert device may be rod shaped and dimensioned to be introduced in the throat in order to obtain a narrowing for a flow-passing through the throat and along the insert device.

Appropriately, the insert device may be tube shaped with an outside diameter substantially the same as a diameter of the throat such that the insert device may be positioned in the throat by sliding. The insert device comprises at an extremity to be introduced in the throat an opening through which the flow may enter in a cavity of the tube shaped insert device.

Appropriately the entrance and exit windows are either hollow or out of material transparent to the radiation beam.

Appropriately the insert device has a tuning fork shaped structure comprising a U shaped extremity and a holder. The U shaped extremity comprises two lateral walls to be positioned in intimate contact with the throat of the Venturi. The lateral walls define an opening for a flow passing through the Venturi.

Appropriately the entrance and exit windows are defined as lateral sides of the opening between the lateral walls oriented towards the periphery of the throat.

Appropriately the holder comprises a cavity to receive a flow passing between the lateral walls.

In a further aspect the invention provides a Venturi based multiphase flow meter which comprises an insert device.

In yet a further aspect the invention provides a Venturi based multiphase flow meter for use with an insert device, comprising at one of its extremities a connection to a pipe forming an assembly. The assembly comprises an opening through which an insert device may be introduced and positioned in the throat of the flow meter.

In a further aspect the invention provides a method for measuring multiphase flows, comprising passing a flow through a Venturi base multiphase flow meter, and inserting an insert device into a throat of the Venturi for narrowing the throat and increasing a pressure drop between an inlet of the Venturi and the throat.

BRIEF DESCRIPTION OF THE FIGURES

The invention will now be described in greater detail with reference to the accompanying drawings, in which.

EVALUATION OF THE WELL EFFLUENT IN THE VENTURI FLOW METER

Oil effluents are usually made up of a multiphase mixture of liquid oil, of gas (hydrocarbons), and of water. Below we use the following notations: the symbols Q and q designate mass flow rates and volume flow rates respectively; the symbol $\rho$ designates density; the symbols $\alpha$ and $\gamma$ designate the static and dynamic proportions of the various phases; and the indices o, w, g and l refer respectively to the oil, water, gas and liquid phases (where the liquid phase is the oil and the water taken together), while the index m designates the fluid mixture.

Figure 1:
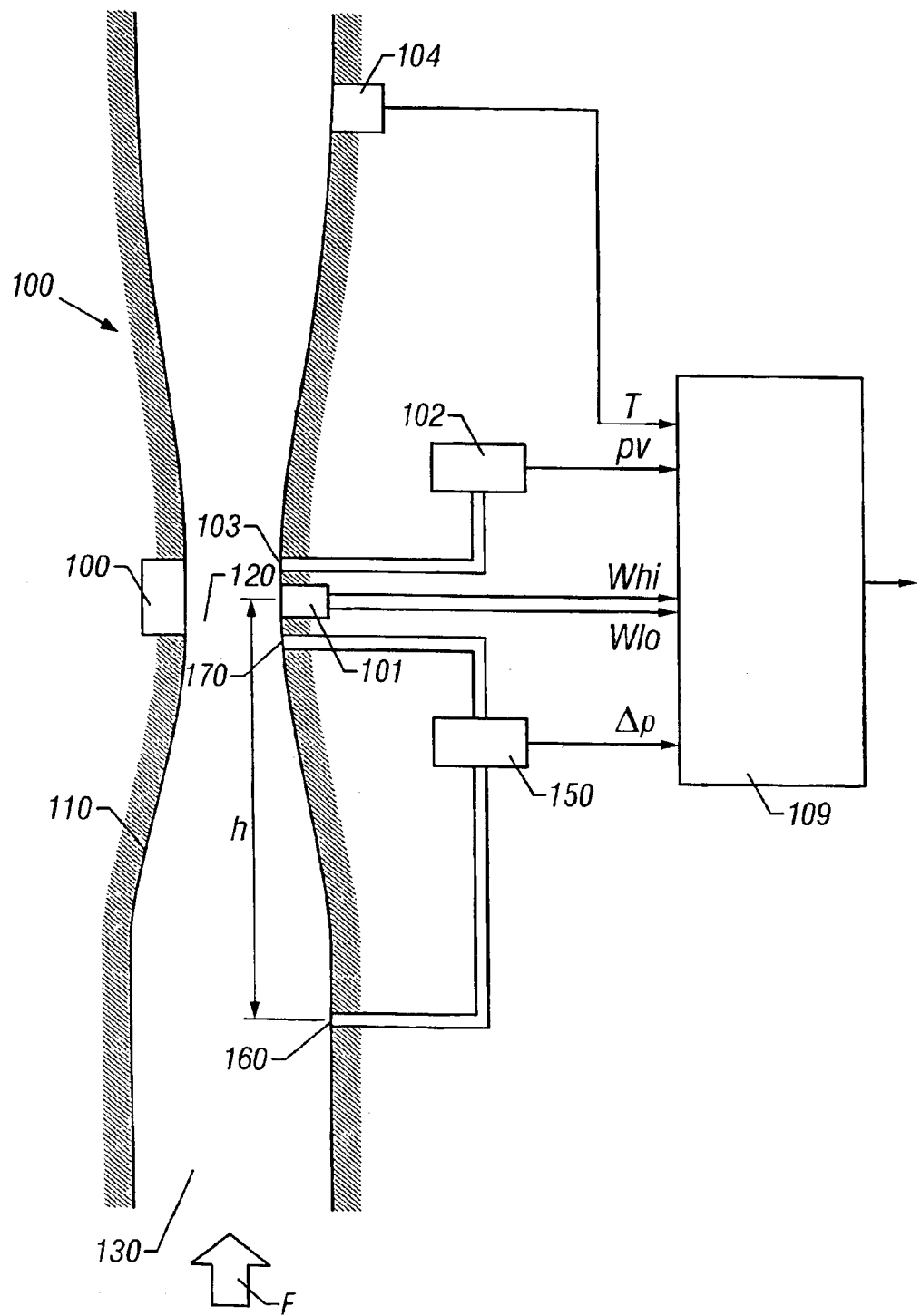
FIG. 1 is a diagram of a flow measuring apparatus known from prior art.

Referring now to FIG. 1 in which a Venturi based flow meter as known from prior art is represented, the device comprises a pipe section 10 comprising a convergent Venturi 110 whose narrowest portion 120 is referred to as the throat. In the shown example, the section of the pipe 100 is disposed vertically and the effluent flows upwards, as symbolized by arrow F.

The constriction of the flow section in the Venturi induces a pressure drop $\Delta p$ between level 130, situated upstream from the Venturi at the inlet to the measurement section, and the throat 120. This pressure drop is associated with the total mass flow rate Q and with the density $\rho_m$ by the following equation:

$$\Delta p = \frac{K \cdot Q^2}{\rho_m} + \rho_m \cdot g \cdot h_V \quad (1)$$

where g is the acceleration due to gravity, $h_V$ is the distance between the upstream level 130 and the throat 120, and K is a constant associated essentially with the geometry of the Venturi, and which is given by:

$$K = \frac{1 - \beta^4}{2C^2 \cdot A^2}$$

where $\beta$ is the constriction ration of the Venturi, i.e. the ration between the diameter of the throat and the upstream diameter of the Venturi, C is the discharge coefficient, and A is the section of the throat. The term $\rho_m \cdot g \cdot h_V$ is generally small or negligible. By writing $\Delta p^* = \Delta p - \rho_m \cdot g \cdot h_V$, equation (1) becomes:

$$Q = k(\Delta p^* \cdot \rho_m)^{1/2} \quad (2)$$

where $k = K^{-1/2}$.

In a preferred embodiment, the ratio $\beta$ is 0.5. With a pipe having a diameter of 10 cm, the diameter of the throat is 5 cm. The discharge coefficient C is about 1. This coefficient depends to a small extend and in predictable manner on the properties of the fluid. Traditionally, this corrective effect is taken into account by the Reynolds number.

The pressure drop $\Delta p$ is measured by means of a differential pressure sensor 150 connected to two pressure takeoffs 160 and 170 opening out into the measurement section respectively at the upstream level 130 and in the throat 120 of the Venturi. In a variant, the measurement may also be performed by means of two absolute pressure sensors connected to the pressure takeoffs 160 and 170, respectively.

The density $\rho_m$ of the fluid mixture is determined by means of a sensor which measures the attenuation of gamma rays, by using a source 100 and a detector 101 placed on opposite sides of the Venturi throat 120. The throat is provided with "windows" of a material that shows low absorption of photons at the energy levels, referred to below as the "high energy" level and the "low energy" level. The detector 101 which comprises in conventional manner a scintillator crystal such as NaI and a photomultiplier produces two series of signals $W_{hi}$ and $W_{lo}$ referred to as count rates, representative of the numbers of photons detected per sampling period in the energy ranges bracketing the above-mentioned levels respectively.

These energy levels are such that the high energy count rate $W_{hi}$ is essentially sensitive to the density $\rho_m$ of the fluid mixture, while the low energy count rate $W_{lo}$ is also sensitive to the composition thereof, thus making it possible to determine the water content of the liquid phase.

FIG. 1 also shows a pressure sensor 102 connected to a pressure takeoff 103 opening out into the throat 120 of the Venturi, which sensor produces signals representative of the pressure $p_V$ in the throat of the Venturi, and a temperature sensor 104 producing signals T representative of the temperature of the fluid mixture. The data $p_V$ and T is used in particular for determining gas density $\rho_g$ under the flow rate conditions and gas flow rate $q_g$ under normal conditions of pressure and temperature on the basis of the value for the flow rate under flow rate conditions, determined in a manner described below. In this respect, it is preferable for the pressure to be measured at the throat of the Venturi. In contrast, it does not matter too much where temperature is measured.

The information coming from the above-mentioned sensors is applied to a data processing unit 109 constituted by a computer running a program for delivering the looked-for results by performing various treatments.

The principle underlying the treatments performed by data processing unit 109 are explained in detail in document WO99/10712 and will not be described here.

Simply, it appears from equation (1) which allows to calculate the differential pressure $\Delta p$, that when the mass flow rate Q is divided by a factor of 10, the differential pressure is divided by one hundred. Hence measuring the differential pressure becomes subject to a relatively low accuracy, and as a consequence e.g. the mass flow rate may not anymore be determined with sufficient accuracy when using equation (2).

The accuracy may not be improved by simply rescaling the differential pressure sensor 150.

Venturi Insert Devices

Several examples of insert devices according to the invention will be described in the following. These include a rod, a tubular and a tuning fork insert.

For the purpose of comparison between the different options presented here, the original throat diameter is assumed to be 52 mm, and an equivalent diameter with any insert is 30 mm. The flow is assumed to be vertical upwards as shown in each Figure by an arrow F.

The Rod Insert

Figure 2:
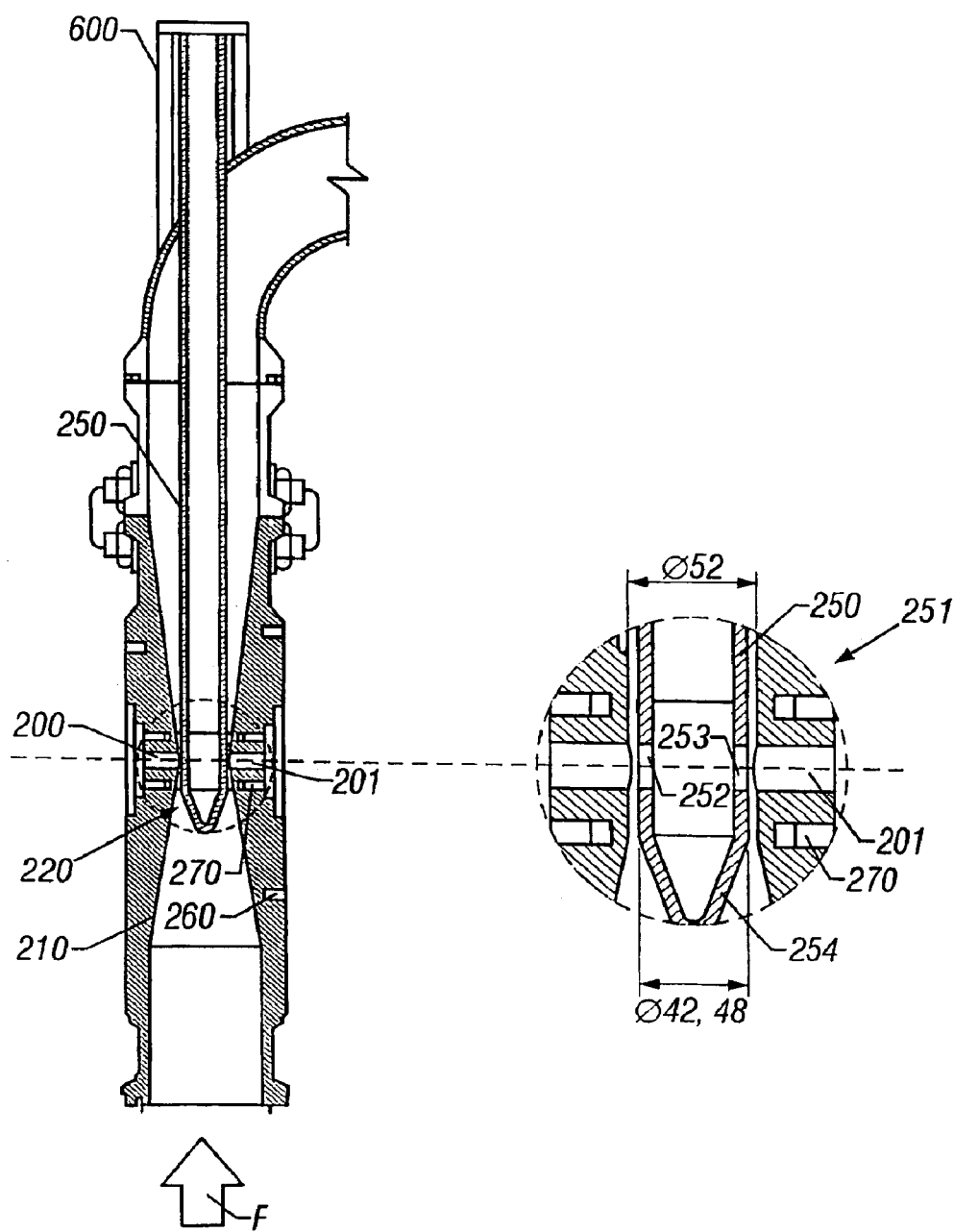
FIG. 2 is a diagram of an insert according to the invention.

Making reference to FIG. 2, a convergent Venturi 210 is represented whose narrowest portion 220 is referred to as the throat. Two pressure takeoffs 260 and 270 open up into the measurement section and allow to gather pressure data to determine the pressure drop $\Delta p$ between the inlet of the Venturi and the throat 220. A gamma ray source 200 emits photon in the throat 220 which may be measured by a detector 201 placed on the opposite side of the throat 220 facing the source 200.

A rod shaped insert device 250 is inserted in the throat 220. A magnified portion 251 of the Venturi shows the inserted rod 250 centrally positioned in the throat 220. As mentioned above, the diameter of the throat was chosen to be 52 mm as an example and for reasons of comparison between all devices presented here. In order to have a flow section equivalent to a Venturi with a 30 mm diameter throat, the outside diameter of the rod shaped insert device 250 has to be 42.48 mm as indicated in FIG. 2.

In a preferred embodiment the rod shaped insert 250 is hollow. An entrance window 252 and an exit window 253 allow the photons emitted by the source 200 to travel across a diameter of the insert in order to be measured by the detector 201. The windows 252 and 253 may be realised out of material which possesses acceptable transparency for the photons emitted by the source 200. The windows may be delimited portions of the rod insert's wall positioned to correspond to the source 200 and the detector 201 or alternatively have the shape of an annular section of the rod insert.

The rod shaped insert is terminated in a rounded cone shape 254. This contributes to improve the geometry of the convergent section in the Venturi, hence optimising the flow passing through the throat.

It is apparent from FIG. 2 that the pressure takeoffs 260 and 270 may continue to be used when the rod shaped insert is present.

The Tubular Insert

Figure 3:
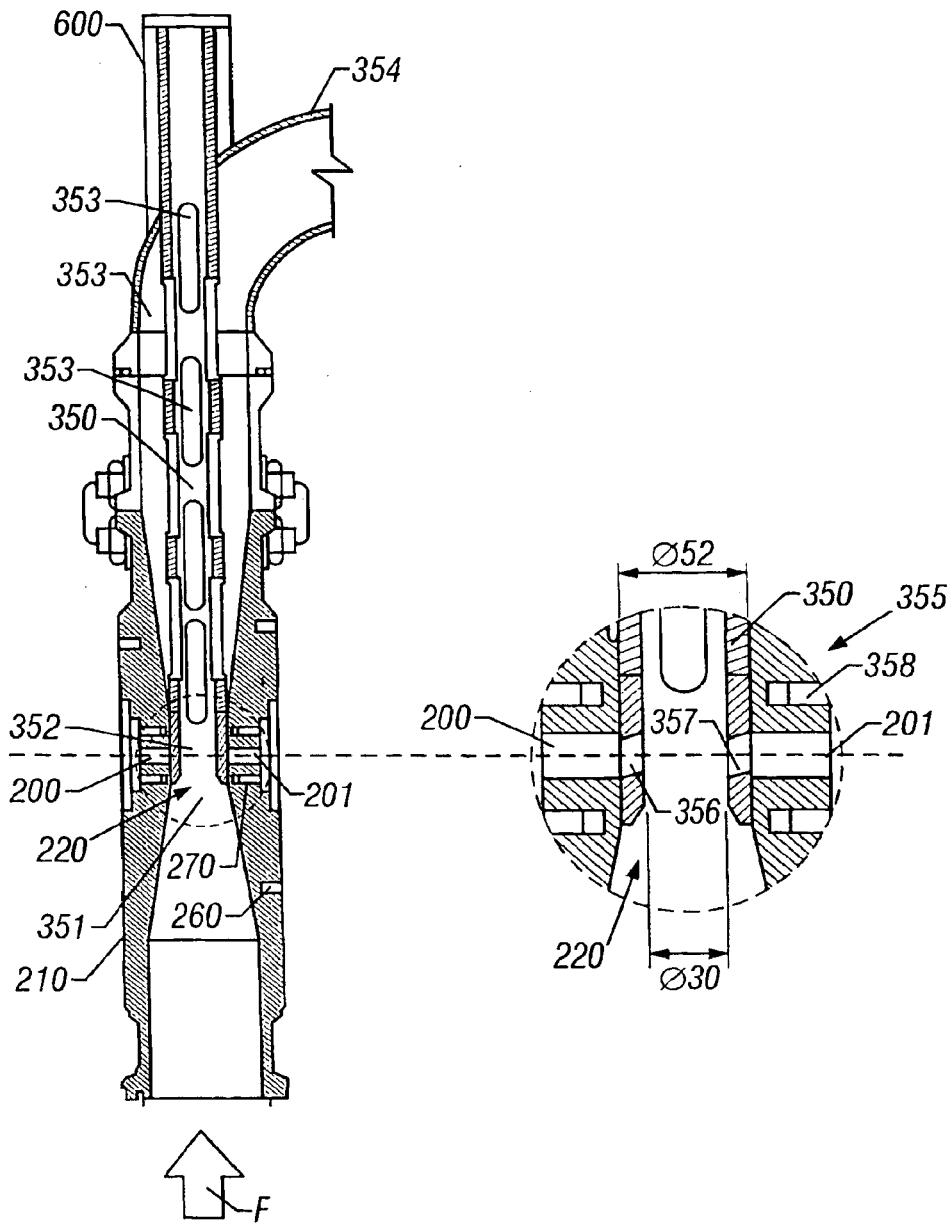
FIG. 3 is a diagram of an insert according to the invention.

FIG. 3 represents a convergent Venturi 210 equivalent to the one shown in FIG. 2. Same reference numbers will be used throughout the description for same elements showed in different Figures.

A tubular insert device 350 is inserted into the throat 220. The tubular insert device 350 has substantially the shape of a tube with an outside diameter of 52 mm, i.e. a diameter equal to the original throat diameter. This way the tubular insert 350 may be positioned in the throat by sliding. The flow F enters in a cavity 352 of the tubular insert 350 through an opening 351 at an extremity of the tubular insert 350. The flow finally exits the cavity 352 through lateral apertures 353 operated in walls of the tubular insert and continues in an outlet 354 of the Venturi.

A magnified view 355 of the Venturi Throat 220 shows the outside diameter of the tubular insert 350 and the inside diameter which measures 30 mm. Entrance and exit windows 356 and 357 are positioned in front of the gamma ray source 200 and detector 201 respectively. The windows 356 and 357 may be made either out of a material which shows transparency to the used radiation or just be hollow, i.e. holes in the wall of the tubular insert 350.

It may be necessary to make openings in the wall of the tubular insert 350 in order to connect, for example, the pressure takeoff 358 with the cavity 352 of the tubular insert.

The Tuning Fork Insert

Figure 4:
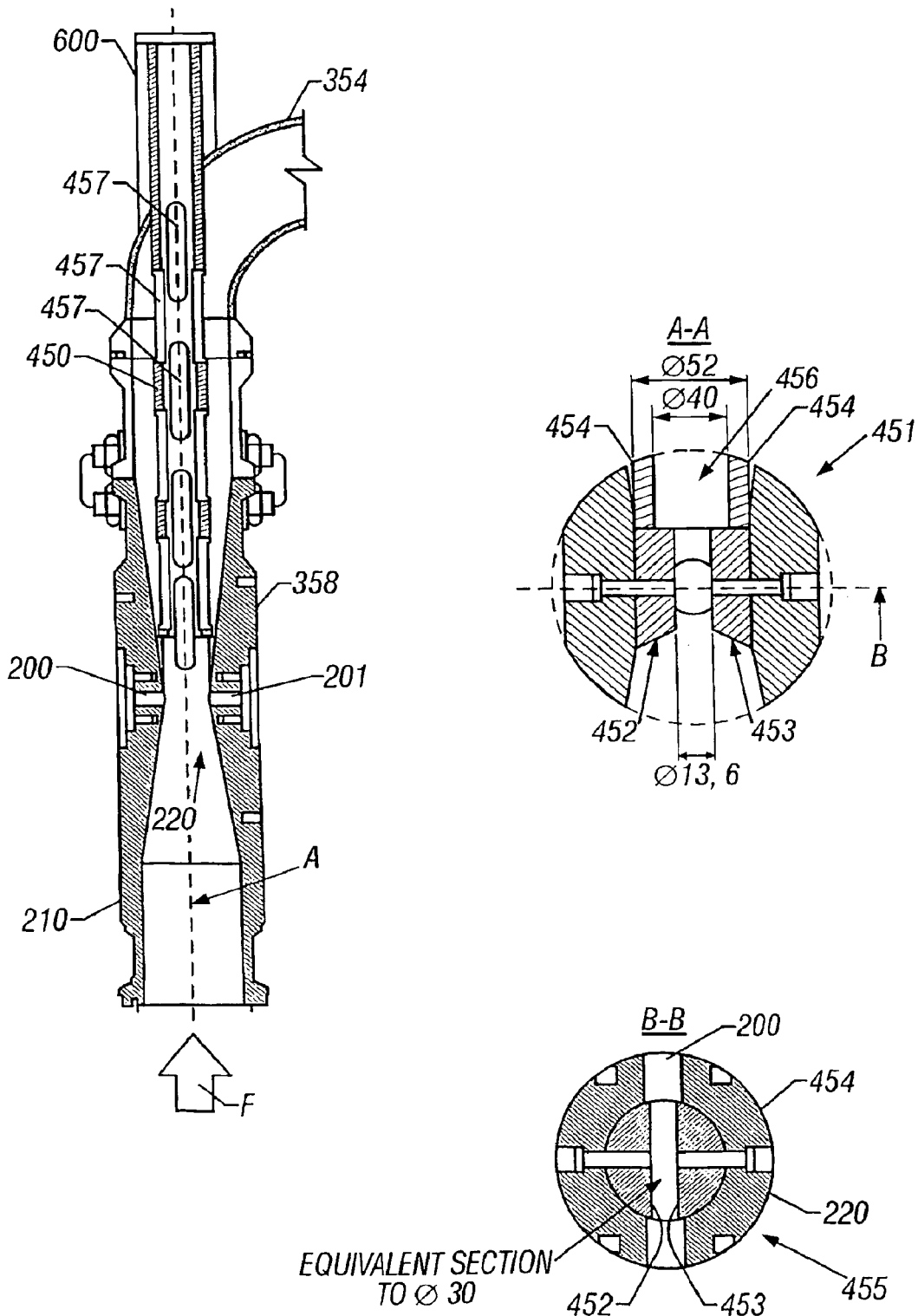
FIG. 4 is a diagram of an insert according to the invention.

FIG. 4 represents a convergent Venturi 210 in which a tuning fork insert 450 has been positioned.

The tuning fork insert 450 is so called because its appearance reminds of the shape of a musical tuning fork, as can be seen in the magnified view 451 of a longitudinal section through the Venturi 210 along the axis A in a plane perpendicular to the drawing. The magnified view 451 shows the U-shaped extremity of the tuning fork insert 450 with lateral walls 452 and 453 of the U-shape.

The lateral walls 452 and 453 of the tuning fork insert 450 comprise outer surfaces which are in intimate contact with the walls of the Throat 220.

A section view 455 which is defined by a plan passing through axis B of the view 451 and perpendicular to the drawing shows the walls of the throat 220 and the lateral walls 452 and 453 of the tuning fork insert 450. The lateral walls 452 and 453 have been dimensioned to create a rectangular opening which offers an opening to the flow F which is equivalent to a circular opening of 30 mm diameter, i.e. a rectangle sized 13.6×52 mm². The throat section of the tuning fork insert 450 is designed in such a way to stabilise the flow and minimise a pressure drop gradient between the lateral walls 452 and 453 of the tuning fork insert.

The opening created by the lateral walls 452 and 453 between the gamma ray source 200 and the detector 201 may be used as a hollow window between the gamma ray source 200 and the detector 201. The same hollow window allows the pressure takeoffs located in the throat section, e.g. pressure takeoff 358 to be directly in contact with the flow.

The extremities of the lateral walls 452 and 453 at the flow inlet may have various shapes in order to optimise the convergent section to different kinds of encountered flows: viscous flow, low flow rate, high gas volume fraction, wet gas . . . .

The divergent section of the tuning fork insert 450, i.e. the section at which the flows exits from between the lateral walls 452 and 453, may be shaped as an abrupt edge. In another embodiment the divergent section may be shaped into a smooth profile to optimise the flow (not shown in FIG. 4).

Referring again to view 451 a holder 454 of the tuning fork insert 450 is shown. The holder 454 is used to position the tuning fork insert 450 fork inside the throat 220. The lateral walls 452 and 453 of tuning fork insert 450 may be mounted on the holder 450 or be an integral part with this one. The size and more particularly the outside diameter of the holder 454 is shown to be 52 mm as an example only. It may have a diameter smaller than the diameter of the throat.

The flow F thus enters the tuning fork insert 450 through the rectangular opening between the lateral walls 452 and 453, arrives into a cavity 456 of the holder 454 and leaves the cavity 456 through lateral apertures 457 operated in walls of the holder 454 to continue in the outlet 354 of the Venturi 210.

Figure 5:
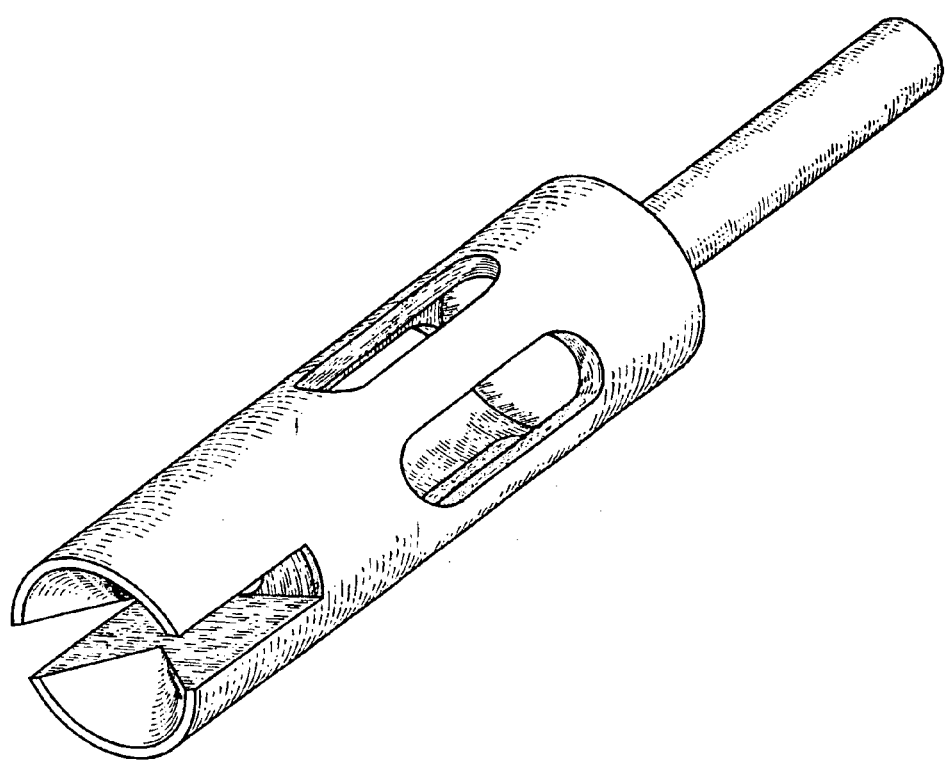
FIG. 5 is a diagram of a 3-dimensional insert view according to the invention.

FIG. 5 represents a 3-dimensional view of a tuning fork insert in which the lateral wall's inner surfaces are each terminated by halves of concave rounded cone shapes. FIG. 5 also shows 4 lateral apertures through which a flow may exit the cavity of the holder.

A possible gap between the outer diameter of the tuning fork insert and the throat diameter needs to be machined precisely in order to avoid any significant leak and any interference with the pressure measurements that would affect the accuracy of the flow rates calculation. In a preferred embodiment positive seals (not represented in the Figures) are applied to prevent leakage.

Common Features to Rod, Tubular and Tuning Fork Insert Devices

All described examples of insert devices may be installed in the Venturi flow meter at the well site. The insert devices may appropriately be installed under pressure conditions. The insert devices are inserted into the throat of the Venturi through an opening 600 (See FIGS. 2–4) located in an elbow of the Venturi outlet.

It is well understood that a Venturi flow meter may also be a cylindrically shaped tube in which the throat is obtained by inserting an insert device. The insertion of the insert device creates a throat, i.e. a narrowing for the flow.

What is claimed is:

1. An insert device for narrowing a throat of a Venturi based multiphase flow meter, the insert device being shaped to be inserted in the throat and the insert comprising an entrance window means and an exit window means for a radiation beam generated at a periphery of the throat.

2. The insert device of claim 1, rod shaped and dimensioned to be introduced in the throat in order to obtain a narrowing for a flow passing through the throat and along the insert device.

3. The insert device of claim 2, hollow and further comprising windows transparent to the radiation beam.

4. The insert device of claim 2, hollow and further comprising an annular section transparent to the radiation beam.

5. The insert device of claim 1, wherein an extremity of the insert device to be introduced in the throat has a rounded cone shape to improve the flow passing through the throat.

6. The insert device of claim 1, tube-shaped with an outside diameter substantially the same as a diameter of the throat such that the insert device may be positioned in the throat by sliding, and further comprising at an extremity to be introduced in the throat an opening through which the flow may enter in a cavity of the tube shaped insert device.

7. The insert device of claim 6, wherein the entrance and exit windows are hollow.

8. The insert device of claim 6, wherein the entrance and exit windows are made out of material transparent to the radiation beam.

9. The insert device of claim 1, having a tuning fork shaped structure comprising a U-shaped extremity and a holder, the U-shaped extremity comprising two lateral walls to be positioned in intimate contact with the throat of the Venturi, the lateral walls defining an opening for a flow passing through the Venturi.

10. The insert device of claim 9, wherein the entrance and exit windows are defined as lateral sides of the opening between the lateral walls oriented towards the periphery of the throat.

11. The insert device of claim 9, wherein each lateral wall has an extremity at a flow inlet with a shape adapted to optimise the flow entering the insert device.

12. The insert device of claim 9, wherein the holder comprises a cavity to receive a flow passing between the lateral walls.

13. The insert device of claim 12, wherein the holder comprises at least one lateral aperture to evacuate the flow out of the cavity.

14. A Venturi based multiphase flow meter comprising an insert device for narrowing a throat of the Venturi based multiphase flow meter, the insert device being shaped to be inserted in the throat and the insert comprising an entrance window means and an exit window means for a radiation beam generated at a periphery of the throat.

15. The Venturi multiphase flow meter of claim 14, further comprising at one of its extremities a connection to a pipe forming an assembly, the connection-pipe assembly comprising an opening through which the insert device may be introduced and positioned in the throat of the flow meter.

16. A method of measuring multiphase flows comprising passing a flow through a Venturi based multiphase flow meter and inserting an insert device into a throat of the Venturi for narrowing the throat and increasing a pressure drop between an inlet of the Venturi and the throat, said insert device being shaped to be inserted in the throat and the insert comprising an entrance window means and an exit window means for a radiation beam generated at a periphery of the throat.

17. An insert device for narrowing a throat of a Venturi based multiphase flow meter, the insert device comprising:
a tuning fork shaped structure having a U-shaped extremity and a holder, the U-shaped extremity having two lateral walls to be positioned in intimate contact with the throat of the Venturi, the lateral walls defining an opening for a flow passing through the Venturi; and
the insert having an entrance window means and an exit window means for a radiation beam generated at a periphery of the throat.

18. The insert device of claim 17, wherein the entrance and exit windows are defined as lateral sides of the opening between the lateral walls oriented towards the periphery of the throat.

19. The insert device of claim 17, wherein each lateral wall has an extremity at a flow inlet with a shape adapted to optimise the flow entering the insert device.

20. The insert device of claim 17, wherein the holder comprises a cavity to receive a flow passing between the lateral walls.

21. The insert device of claim 20, wherein the holder comprises at least one lateral aperture to evacuate the flow out of the cavity.

22. A Venturi based multiphase flow meter having an insert device for narrowing a throat of the Venturi based multiphase flow meter, comprising:
the insert having a tuning fork shaped structure having a U-shaped extremity and a holder, the U-shaped extremity having two lateral walls to be positioned in intimate contact with the throat of the Venturi, the lateral walls defining an opening for a flow passing through the Venturi; and
the insert having an entrance window means and an exit window means for a radiation beam generated at a periphery of the throat.

23. The Venturi multiphase flow meter of claim 22, further comprising at one of its extremities a connection to a pipe forming an assembly, the connection-pipe assembly comprising an opening through which the insert device may be introduced and positioned in the throat of the flow meter.

24. A method of measuring multiphase flows comprising:
passing a flow through a Venturi based multiphase flow meter; and
inserting an insert device into a throat of the Venturi for narrowing the throat and increasing a pressure drop between an inlet of the Venturi and the throat, said insert device having a tuning fork shaped structure comprising a U-shaped extremity and a holder, the U-shaped extremity comprising two lateral walls to be positioned in intimate contact with the throat of the Venturi, the lateral walls defining an opening for a flow passing through the Venturi and the insert comprising an entrance window means and an exit window means for a radiation beam generated at a periphery of the throat.

* * * * *